July 23, 1957 R. C. BRADFORD ET AL 2,800,534

ELECTROMAGNETIC TRANSDUCER

Filed March 15, 1956

INVENTORS
REX C. BRADFORD
HENRY R. KELSOF

Harry T. Berriman
AGENT

United States Patent Office 2,800,534
Patented July 23, 1957

2,800,534

ELECTROMAGNETIC TRANSDUCER

Rex C. Bradford, Wappingers Falls, and Henry R. Kelsof, Carmel, N. Y., assignors to International Business Machines Corporation, New York, N. Y., a corporation of New York Application March 15, 1956, Serial No. 571,804

6 Claims. (Cl. 179—100.2)

This invention relates to magnetic recording and reproducing apparatus of the type employed with elongated oxide coated recording tapes. The invention relates in particular to improvements to the magnetic heads or transducers through which the recording tape is magnetically affected to impart the recording thereto or to read it therefrom.

The principal object of the invention is to provide an improved magnetic transducer for use with magnetic oxide coated recording tape and wherein buildup of oxide particles from the tape on the transducer is minimized.

Another object is to provide an improved magnetic transducer for use with magnetic oxide coated recording tape and wherein the cooperating portion of the transducer with the tape includes a silver amalgam contact surface for minimizing the buildup of oxide particles from the tape on the transducer.

Another object of the invention is to provide an improved transducer for use with magnetic oxide coated recording tape and a method for manufacturing the improved transducer.

Other objects of the invention will be pointed out in the following description and claims and illustrated in the accompanying drawings, which disclose, by way of example, the principle of the invention and the best mode, which has been contemplated of applying that principle.

Figure 2:
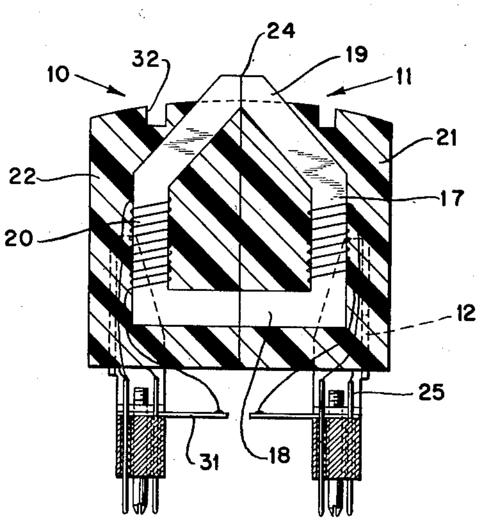
Fig. 2 is a vertical section view taken on the plane of the line 2—2 of Fig. 1.
Figure 1:
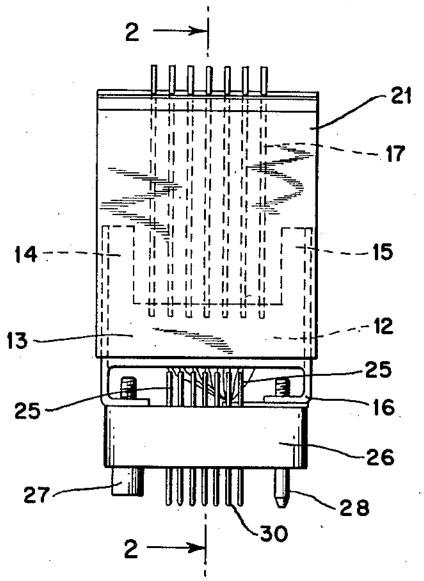
Fig. 1 is a right end elevation view of the improved transducer prior to the packing of the silver amalgam therein, the cores and mounting members therefor being shown in phantom to facilitate illustration.

Referring now to Figs. 1 and 2, the improved transducer comprises left and right hand sections, generally designated 10 and 11 in Fig. 2, each section being the mirror image of its counterpart. Each of the sections includes a core support member 12 which is formed of a suitable rigid nonmagnetic material, the support members being indicated in phantom in Figs. 1 and 2. Each support member has a main body portion 13 and laterally extending end portions 14 and 15 as best shown in Fig. 1. A bracket member 16 is secured to the main body portion 13 and end portions 14 and 15 of each support member 12 and is utilized in a manner that will be later explained. The main body portion of each support member has a member of spaced grooves cut in the one surface thereof, each groove receiving a core member 17 constructed of a high permeability magnetic material. Each core member 17 is thin and flat in cross section and includes a main body portion and a laterally extending core arm 18 at one end, and an angularly extending core arm 19 at its other end. A winding 20 is wrapped around the main body portion of each core member as indicated in Fig. 2.

In the particular embodiment of the transducer shown, the core support member 12, portions of the associated bracket 16, and the related cores 17 and their windings 20, are arranged within a related right or left body member 21 or 22, respectively, the body member being constructed of a nonmagnetic material. The body member may be formed of brass and formed in sections with suitable cavities therein to receive the associated core support 12 and cores 17 etc., or the body member may be formed of a suitable epoxy resin etc. which is cast around the various associated members. In any case, however, each body member 21 or 22 is arranged around the associated cores 17 so that the tips of the core arms 19 thereof extend above the related body members 21 or 22, while the end of the arms 18 are flush with the one surface of the related body member as indicated.

There are an equal number of cores 17 provided for both left and right hand sections of the transducer and after the body members 21 and 22 are arranged around their respective core support 12 and cores 17, the two body members are rigidly secured together in any suitable manner so that corresponding cores of the two sections are aligned as indicated in Figs. 1 and 2. As the left and right hand sections are secured together, a thin piece of Mylar material is inserted between the tips of the core arms 19 to provide a nonmagnetic gap area. Prior to the assembly of the two sections together and the insertion of the Mylar material, the vertical gap surface of both core arms 19 are carefully lapped to provide flat surfaces for the gap material. The lower ends of the arms 18 of each of the aligned cores are brought into intimate contact as the sections are engaged as to provide a continuous magnetic path for each pair of cores from the gap material 24, through the one core of each pair, through the related core of that pair, to the gap material. There is a pair of cores provided for each so-called track of the magnetic tape on which it is desired to record, or from which it is desired to read. Thus the representative transducer shown is a 7 track head.

One end of each of the windings 20 of each section of the transducer is connected to the upper end of a related contact pin 25 which is supported by and extends through a corresponding insulating plug member 26, each member 26 being secured to the bracket 16 of the associated section by related pin members 27 and 28. The lower extending portion 30 of each pin 25 serves as a pluggable terminal.

The other end of each of the windings 20 of each section of the transducer is connected to a common ground lug 31 which is rigidly secured between the bracket 16 of that section and associated member 26 by the corresponding pin member 28. Each pin member 28 is electrically conductive and extends through the member 26 to form a pluggable grounding terminal for the related group of windings. It is evident that each pair of associated windings of the transducer is connectable to suitable external circuitry for controlling the recording of magnetic data representations, or the reading of magnetic data representations on a cooperating magnetic data tape, by plugging the terminal portions of contact pairs 25 and pin members 28 into a suitable mating socket structure. The lower extending portion of each of the pin members 27 is adapted to engage a related opening in the socket structure (not shown) as the transducer is plugged into the socket. The pin members 27 serve no electrical function but, by being larger than the pin members 28, the pluggable terminal arrangement of the transducer is polarized (the transducer may be inserted in the related socket structure in the proper direction only).

Figure 3:
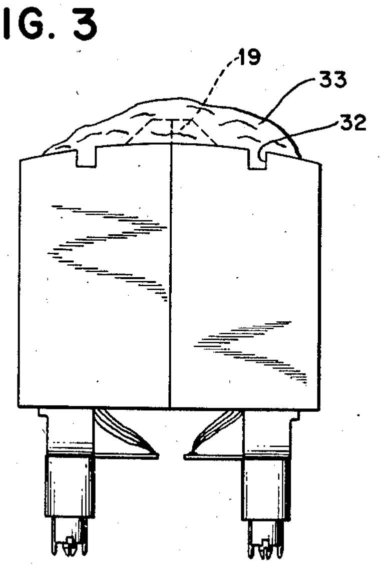
Fig. 3 is a front elevation view of the improved transducer with silver amalgam being shown packed over the core tips of the transducer.

Referring now to Figs. 1 and 2, it will be noted that each of the body members 21 and 22 has a longitudinally extending cavity 32 in the upper surface thereof, the cavities extending parallel to the adjacent series of exposed tips of the core arms 19. The improved transducer structure is achieved after the transducer has been assembled to the point indicated in Figs. 1 and 2, by packing silver amalgam 33 over the upper surface of the transducer, the amalgam being packed over the exposed core tips and into the cavities 32 as indicated in Fig. 3. The amalgam is prepared in the same fashion that dentists prepare silver alloy-mercury amalgam utilized for filling dental cavities. The procedure is to mix any commercially available dental silver alloy powder with mercury, the proportions of mercury to alloy by weight being in the general range of 1.3–1.7 to 1.0, the actual proportions not being too critical. The alloy and mercury may be mixed manually by the mortar-pestle procedure or in other ways.

Figure 4:
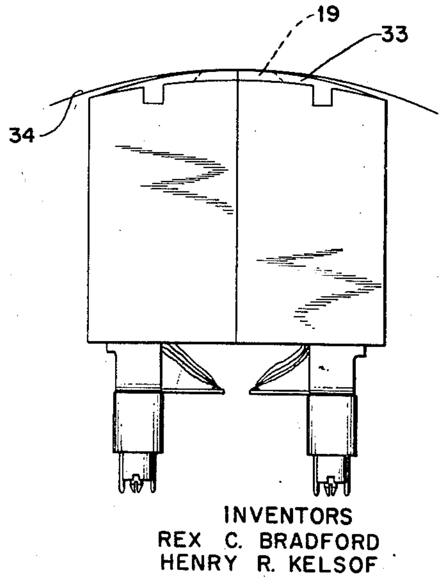
Fig. 4 is a front elevation view of the finished transducer with the amalgam being ground down to expose the core tips and form a smooth arcular surface for cooperation with the tape.

After the amalgam is prepared, it is packed into the cavities 32 and over and between the exposed core tips, as previously mentioned, until an upper surface in the general form of the desired final head shape is obtained. The amalgam is packed onto the transducer by repeated application of relatively small amounts of the amalgam, and as the packing is effected, excess mercury is expressed from the amalgam by mechanical pressure of the packing tool, the excess mercury being scraped or wiped off the packed mass. After the desired rough head shape is obtained, the amalgam is allowed to set for about 24 hours. Thereafter, the amalgam mass and the core tips are ground from the shape of Fig. 3, to a desired final curved contour as indicated in Fig. 4. It will be noted in Fig. 4 that the upper surface of the core arm tips are arcular and flush with the amalgam surface.

A magnetic oxide coated tape 34 with which the transducer is to be utilized, is advanced in the longitudinal direction of the tape over the curved transducer surface as represented in Fig. 4. The tape 34 is of a sufficient width to span all 7 pairs of exposed core tips of the transducer. If recording is to be effected, suitable recording currents are passed through one pair or combinations of pairs of the windings 20 of the related 7 pairs of cores, as desired, by the action of suitable external circuitry (not shown). As the windings of any pair of cores are energized, the resultant magnetic field generated at the gap between the exposed cores tip, effects a corresponding magnetization of the oxide portion of the adjacent area of the related track of the tape 34 in the usual manner.

If reading is to be effected, the motion of the tape and the related movement of any magnetized area of a track thereof past the corresponding core tips, produces a rate of change of flux in those cores, which, in turn, generates an electric voltage in the related windings. This induced voltage is applied from the windings to suitable external amplifying circuitry to generate a suitable representation of the magnetic information read.

It will be appreciated that as the tape 34 is repeatedly passed over the transducer head surface, oxide particles of the tape are dislodged therefrom by the abrasive action between the tape and the head. With prior transducers, these particles build up on the head to such an extend as to give erroneous recording or reading indication at random times. With the amalgam head surface provided for the transducer, however, it has been found that the build-up of oxide particles on the head is prevented or minimized to such an extent that read or write errors as a result of loose oxide particles are eliminated.

While there have been shown and described and pointed out the fundamental novel features of the invention as applied to a preferred embodiment, it will be understood that various omissions and substitutions and changes in the form and details of the device illustrated and its operation, and in the method for producing it, may be made by those skilled in the art without departing from the spirit of the invention. It is the intention therefore, to be limited only as indicated by the scope of the following claims.

What is claimed is:

1. An electromagnetic transducer head assembly comprising, in combination, a supporting structure formed of non-magnetic material and rigidly supporting an electromagnetic transducer device said electromagnetic transducer device having an elongated loop formed of magnetic material, said loop having a gap at one end formed by confronting ends of said material, a silver amalgam member in intimate contact with portions of said loop adjacent said gap area, said loop portions and said amalgam section having congruent surfaces contoured to form a continuous and smooth surface for engagement with a traveling magnetic impulse record member passed thereover and adapted to span said non-magnetic gap, and electrical coil means surrounding a portion of said loop.

2. An electromagnetic transducer head assembly comprising, in combination, a supporting structure formed of non-magnetic material and rigidly supporting an electromagnetic transducer device, said electromagnetic transducer device comprising a core loop formed of a magnetic material, said loop having a gap at one end formed by confronting ends of said material, a silver amalgam member surrounding and in intimate contact with portions of said loop adjacent said gap area, said loop portions and said amalgam member being contoured to form a continuous and smooth surface for engagement with a traveling magnetic impulse record member passed thereover and spanning said gap, said silver amalgam section being comprised of an alloy of dental silver with mercury, the proportions of mercury to alloy by weight being in the range of 1.3–1.7 to 1.0, and electrical coil control means surrounding a portion of said loop.

3. An electromagnetic transducer head comprising, in combination, a core loop formed of a magnetic material, said loop having a gap therein formed by confronting pole tip portions of said core loop, said pole tips including a surface thereof arcularly shaped to engage a traveling magnetic impulse record passed thereover and spanning said gap, a non-magnetic member rigidly supporting said core loop, a silver amalgam member secured to said support member and extending partially around said pole tips, said member including an arcular surface continuous with said arcular surface of the pole tips, and electrical coil control means surrounding a portion of said loop.

4. An electromagnetic transducer head assembly comprising, a plurality of core loop members, each said members being formed of a magnetic material and having a gap therein formed by confronting pole tip portions of that core loop, said pole tip portions of each core loop having a surface thereof contoured to engage a traveling magnetic impulse record passed thereover and spanning said gap, a non-magnetic member for supporting said loops in spaced relationship in a direction transverse to the direction of movement of said magnetic impulse record, a silver amalgam member secured to said supporting member and arranged around and between the pole tip portions of adjacent core loop, said member including a surface flush with said contoured pole tips and also accordingly engaged by said record medium in its movement thereover, and individual electrical coil control means surrounding a portion of each of said core loops.

5. An electromagnetic transducer head assembly comprising a non-magnetic supporting member, a pair of magnetic core members rigidly supported by said supporting member and with one end of each said core members extending toward the corresponding end of the other core member but spaced therefrom so as to form a non-magnetic gap therebetween, another end of each said core members also extending toward each other and into frictional engagement so as to form a continuous magnetic path therebetween, a surface of said core members proximate said gap being shaped to engage a traveling magnetic impulse record passed thereover and spanning said gap, a silver amalgam member secured to said supporting member and arranged partially around the area ends of said core members, said amalgam member including a shaped surface flush with said shaped surface of the core members and accordingly also engaged by said record medium in its movement path over the transducer, and individual electrical coil control means surrounding at least one of said core members between its ends.

6. An electromagnetic transducer head assembly comprising, in combination, a supporting assembly formed of a non-magnetic material, a core loop formed of a magnetic material, said loop having a gap therein formed by confronting ends of said core, said core loop being rigidly suppored by said supporing assembly, a non-magnetizable spacer arranged in said gap between the confronting core ends and defining substantially the desired width of said gap, an outer surface of said loop on each side of said gap being contoured for engagement with a traveling magnetizable record medium passed thereover with each successive portion of said record medium spanning said non-magnetic gap in turn, a silver amalgam member secured to said supporting member and surrounding said contoured loop section and including a surface flush with said loop contoured surface and also engaged by said traveling record medium, a pair of multiple turn windings wound on said core loop, said windings being similarly poled, said windings being selectably operable as output coils response to changing flux in said core loop to produce output signals, and operable as input coils responsive to current therethrough to produce a corresponding flux in said core loop.

No references cited.